United States Patent
Basler-Reeder et al.

(10) Patent No.: US 10,816,684 B2
(45) Date of Patent: Oct. 27, 2020

(54) METHOD FOR RAPID CALIBRATION OF SEISMIC INTERVAL ATTRIBUTES TO ROCK PROPERTIES FOR ASSESSMENT UNCERTAINTY

(71) Applicants: Kyle J. Basler-Reeder, Spring, TX (US); Michael P. Matheney, The Woodlands, TX (US); Edward B. Donaldson, Conroe, TX (US)

(72) Inventors: Kyle J. Basler-Reeder, Spring, TX (US); Michael P. Matheney, The Woodlands, TX (US); Edward B. Donaldson, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 394 days.

(21) Appl. No.: 15/835,711

(22) Filed: Dec. 8, 2017

(65) Prior Publication Data
US 2018/0217281 A1    Aug. 2, 2018

Related U.S. Application Data

(60) Provisional application No. 62/453,603, filed on Feb. 2, 2017.

(51) Int. Cl.
*G01V 1/30*    (2006.01)
*G01V 1/28*    (2006.01)

(52) U.S. Cl.
CPC .............. *G01V 1/282* (2013.01); *G01V 1/302* (2013.01); *G01V 1/306* (2013.01); *G01V 1/307* (2013.01); *G01V 2210/66* (2013.01)

(58) Field of Classification Search
CPC ........ G01V 1/282; G01V 1/302; G01V 1/306; G01V 1/307; G01V 2210/66
See application file for complete search history.

(56) References Cited

U.S. PATENT DOCUMENTS

| | | | | |
|---|---|---|---|---|
| 5,487,001 A | * | 1/1996 | Neff ....................... | G01V 1/282 702/14 |
| 5,706,194 A | * | 1/1998 | Neff ....................... | G01V 1/282 702/14 |
| 7,254,091 B1 | | 8/2007 | Gunning et al. | |

(Continued)

OTHER PUBLICATIONS

Avseth, P. et al., (2016) "Combining burial history and rock physics modeling to constrain AVO analysis", The Leading Edge, pp. 528-534.

(Continued)

*Primary Examiner* — Krystine E Breier
(74) *Attorney, Agent, or Firm* — ExxonMobil Upstream Research Company—Law Department

(57) ABSTRACT

A method, including: calibrating a linear rock physics model to well log properties; generating a plurality of pseudo-well models for a subsurface region using a Monte Carlo approach; generating synthetic seismic traces from each of the plurality of pseudo-well models; computing top and base isochron from the synthetic seismic traces; computing seismic attributes in an interval specified by the top and base isochron on the synthetic seismic traces; correlating the seismic attributes to rock properties; and transforming seismic data into low-side, most-likely, and high-side estimates of rock properties.

9 Claims, 12 Drawing Sheets

(56) References Cited

U.S. PATENT DOCUMENTS

| | | | | |
|---|---|---|---|---|
| 7,706,981 | B2* | 4/2010 | Wilkinson | G01V 1/282 |
| | | | | 702/14 |
| 7,869,955 | B2* | 1/2011 | Zhang | G01V 1/282 |
| | | | | 702/14 |
| 8,688,425 | B2 | 4/2014 | Oppert et al. | |
| 9,581,710 | B2* | 2/2017 | Leiceaga | G01V 1/306 |
| 10,274,625 | B2* | 4/2019 | Roy | G01V 1/282 |
| 2008/0162093 | A1* | 7/2008 | Nivlet | G01V 1/30 |
| | | | | 703/2 |
| 2010/0001713 | A1 | 1/2010 | Royle | |
| 2018/0292552 | A1* | 10/2018 | Ramsay | G01V 1/50 |

OTHER PUBLICATIONS

Ayeni, G., et al. (2008) "Extending reservoir property prediction with pseudo-wells" *First Break*, vol. 26, November, pp. 57-62.

Connolly, Patrick A, et al., (2016) "Stochastic Inversion by Matching to Large Numbers of pseudo-wells", *Geophysics*, vol. 81, issue 2, pp. M7-M22.

De Groot, P., et al., (1996) "Monte Carlo simulation of wells" *Geophysics*, vol. 61, No. 3, pp. 631-638.

PetroWiki, "Seismic attributes for reservoir studies" petrowiki.org/Seismic_attributes_for_reservoir_studies, 14 pages, obtained on Dec. 1, 2017.

Spikes, K., et al. (2004) "Pseudo-well and synthetic seismic data generation" 74th Annual International Meeting, *SEG, Expanded Abstracts*, 4 pages.

Whitcombe, D. N., et al., (2002) "Extended elastic impedance for fluid and lithology prediction", *Geophysics*, vol. 67, No. 1, pp. 63-67.

\* cited by examiner

METHOD FOR RAPID CALIBRATION OF SEISMIC INTERVAL ATTRIBUTES TO ROCK PROPERTIES FOR ASSESSMENT UNCERTAINTY

CROSS-REFERENCE TO RELATED APPLICATION

This application claims the benefit of U.S. Provisional Patent Application 62/453,603 filed Feb. 2, 2017 entitled METHOD FOR RAPID CALIBRATION OF SEISMIC INTERVAL ATTRIBUTES TO ROCK PROPERTIES FOR ASSESSMENT UNCERTAINTY, the entirety of which is incorporated by reference herein.

TECHNOLOGICAL FIELD

Exemplary embodiments described herein pertain generally to the field of quantitative seismic reservoir characterization (also known as seismic rock property inversion), which is the process of building a subsurface rock property model that is constrained by, or derived from, seismic data.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic data in the time domain includes reflectors whose relative position in time indicates the structure, and whose amplitude indicates elastic properties. Furthermore, patterns in how amplitude changes with offset (AVO) also are indicative of elastic properties. Elastic property inversion relies on the relationship of elastic properties to AVO properties (related through the AVO model). Rock property inversion uses the relationship(s) of rock properties to elastic properties (the rock physics model) to convert elastic properties into rock properties. The combination of these two inversion steps is how rock properties can be directly derived from seismic data.

SUMMARY

A method, including: calibrating a linear rock physics model to well log properties; generating a plurality of pseudo-well models for a subsurface region using a Monte Carlo approach; generating synthetic seismic traces from each of the plurality of pseudo-well models; computing top and base isochron from the synthetic seismic traces; computing seismic attributes in an interval specified by the top and base isochron on the synthetic seismic traces; correlating the seismic attributes to rock properties; and transforming seismic data into low-side, most-likely, and high-side estimates of rock properties.

In the method, the correlating can include predicting pore thickness and porosity from a correlation between at least one of the seismic attributes to rock properties, and the method can further include predicting net sand thickness from the pore thickness and porosity predictions.

The method can further include: refining the porosity prediction based on the net sand thickness prediction through generation of a tuning curve; and recomputing the net sand thickness by taking a quotient of the predicted pore pressure and a corrected porosity prediction.

The method can further include generating the tuning curve by examining cross-plots of model thickness vs. predicted porosity residual.

In the method, the computing seismic attributes can include analyzing cross-plots of pore thickness vs. each of the seismic attributes, determining a most predictive seismic attribute, and generating a calibrated seismic attribute to pore thickness prediction function.

The method can further include extracting hydrocarbons from a location in a reservoir determined from the net sand thickness.

The method can further include calibrating interbedded shale thickness and number of sands with a cross-plot of net sand thickness to isochron thickness.

The method can further include distributing predicted rock properties into a seismic-consistent 3D geologic model with a variogram.

A method, including: calibrating a linear rock physics model to well log properties; generating a plurality of pseudo-well models for a subsurface region using a Monte Carlo approach; generating synthetic seismic traces from each of the plurality of pseudo-well models; computing seismic attributes on the synthetic seismic traces; correlating the seismic attributes to net hydrocarbon pore thickness; transforming seismic data into low-side, most-likely, and high-side net hydrocarbon pore thickness maps; and estimating an oil volume from a product of a mean of the net hydrocarbon pore thickness from a given one of the maps and an area of a region on the given one of the maps.

The method can further include causing oil to be extracted from a reservoir corresponding to the region on the given one of the maps.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement can include a rock physics model that can be quickly calibrated (converts rock properties into elastic properties), synthetic model generation (converts elastic properties into synthetic seismic data), attribute analysis that converts seismic time series data into seismic interval amplitude attributes, and cross-plotting to correlate seismic amplitude attributes to low-side, most-likely, and high-side rock property estimates (most importantly, net sand thickness, net-to-gross, and average sand porosity). The models generated are known as pseudo-wells, which are 1D objects containing information about vertical rock property changes (De Groot et al., 1996). Using the calibrated model-to-data prediction function achieves the two steps of elastic and rock property inversion to create rock property estimates directly from seismic data. Other authors have shown methods for doing this (e.g. Spikes 2004, Ayeni et al. 2008), but no authors demonstrate the usage of rapid interval attribute modeling for direct assessment purposes. The correlation relationship that is created can then be applied to seismic data to create 2D maps of low-side, most-likely, and high-side rock property estimates (including volumetric estimates). These results can be used for rapid quantitative assessment by constraining the range of possible and plausible rock property distributes, and also can be used for geologic model construction through application of a variogram to distribute net sand thickness and average sand porosity. Furthermore, the technique can be applied to quantitative 4D seismic applications as well as spectrally decomposed interval attribute analysis to further constrain thin (below tuning) reservoir properties.

Inputs

The description of the following workflow will make reference to the following:
Vp=well log(s) Vp;
Vs=well log(s) Vs;
Rho=well log(s) density;
Vshale=well log(s) shale fraction (equal to 1−sand fraction);
Phit=well log(s) porosity;
Wavelets=wavelet(s) corresponding to seismic angle stack(s);
Attributes=seismic amplitude interval attributes(s);
Traces=seismic trace(s) extracted at wellbore sample(s);
Isochron=Region of interval amplitude defined as top-to-base zero crossings;
Pore Thickness=sum of the product of net sand fraction and average sand porosity in the interval;
Porosity=average of sand porosity in the interval; and
Net Sand Thickness=sum of net sand fraction in the interval.

Figure 1:
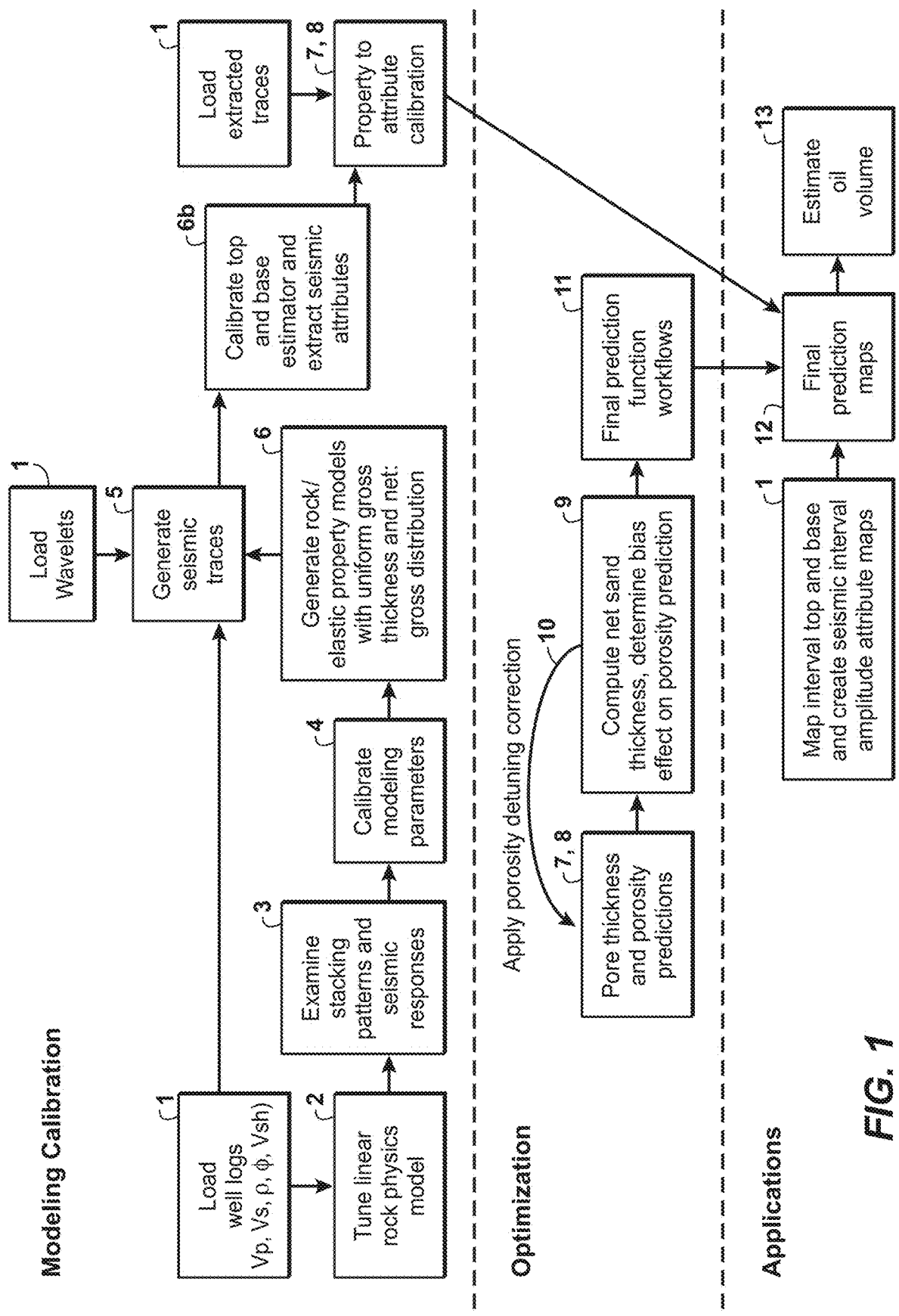
FIG. 1 illustrates an exemplary method embodying the present technological advancement.

FIG. 1 illustrates an exemplary method embodying the present technological advancement. Compared to manual quantitative seismic interval attribute calibration methods, this method is much faster, and provides useful estimations of uncertainty (low-side, most likely, and high-side). Assuming the default seismic interpretation steps of well tie, wavelet extraction, data conditioning, seismic volume optimization, reservoir interval mapping, and interval (between top and base of isochron) attribute calculation are complete, the proposed method can be completed in a matter of hours. This stands in contrast to other quantitative inversion routines, which can take days or weeks of work to produce meaningful results. Applying the prediction function can be done in any platform where interpretations are made, so long as that platform allows a scalar to be applied to interval attribute maps.

Figure 2:
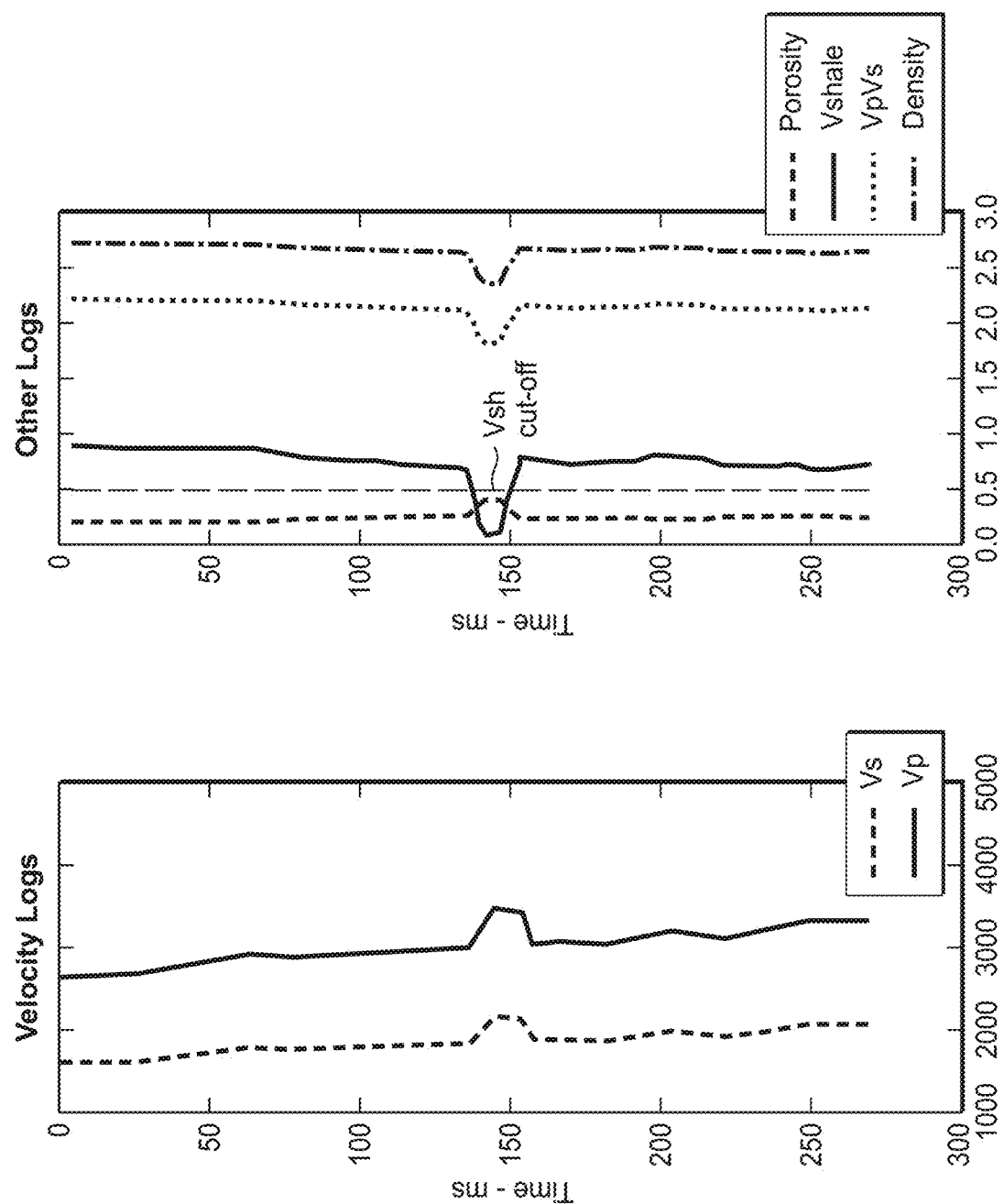
FIG. 2 illustrates examples of well log displays.
Figure 3:
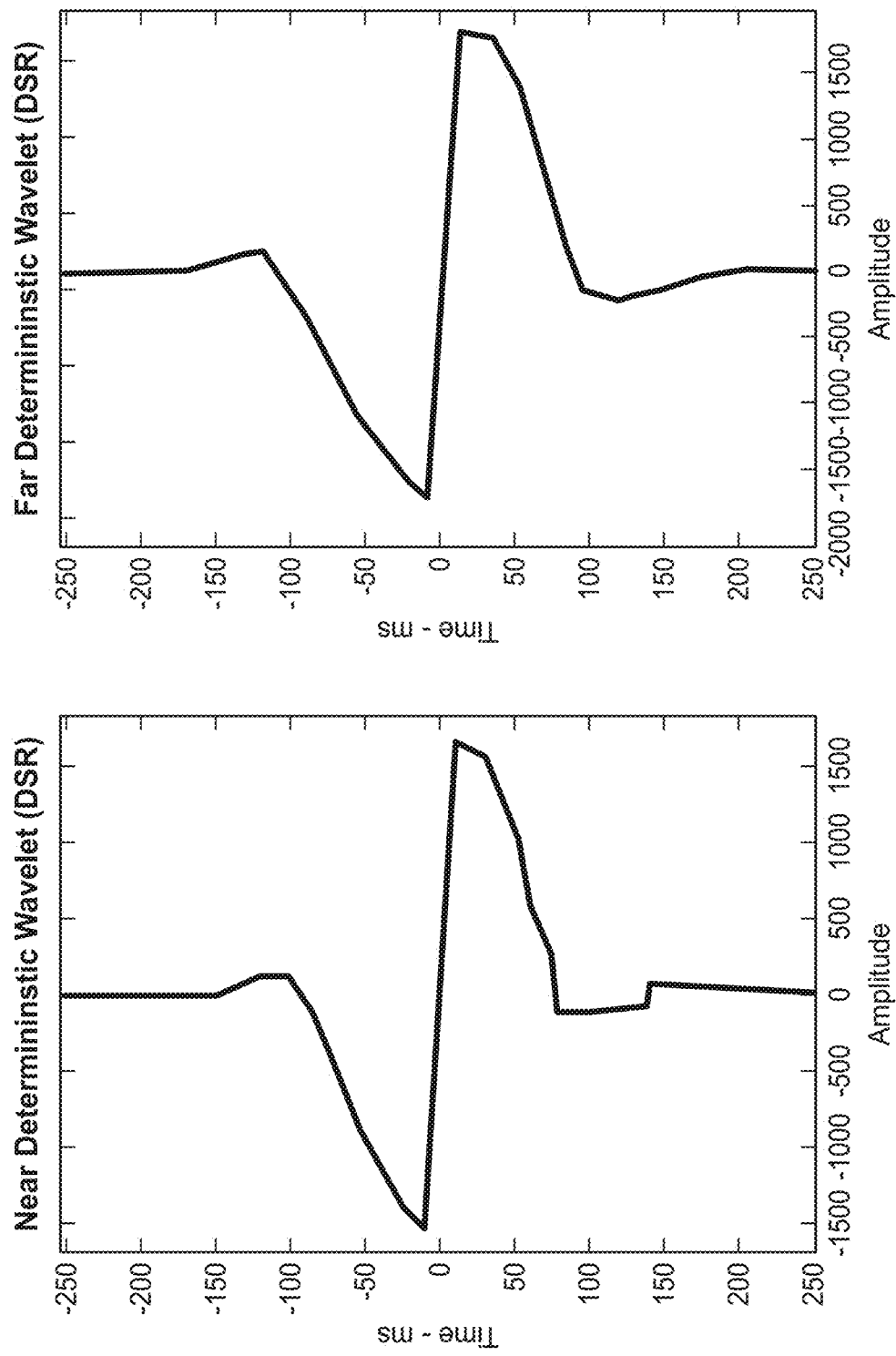
FIG. 3 illustrates examples of wavelets.
Figure 4:
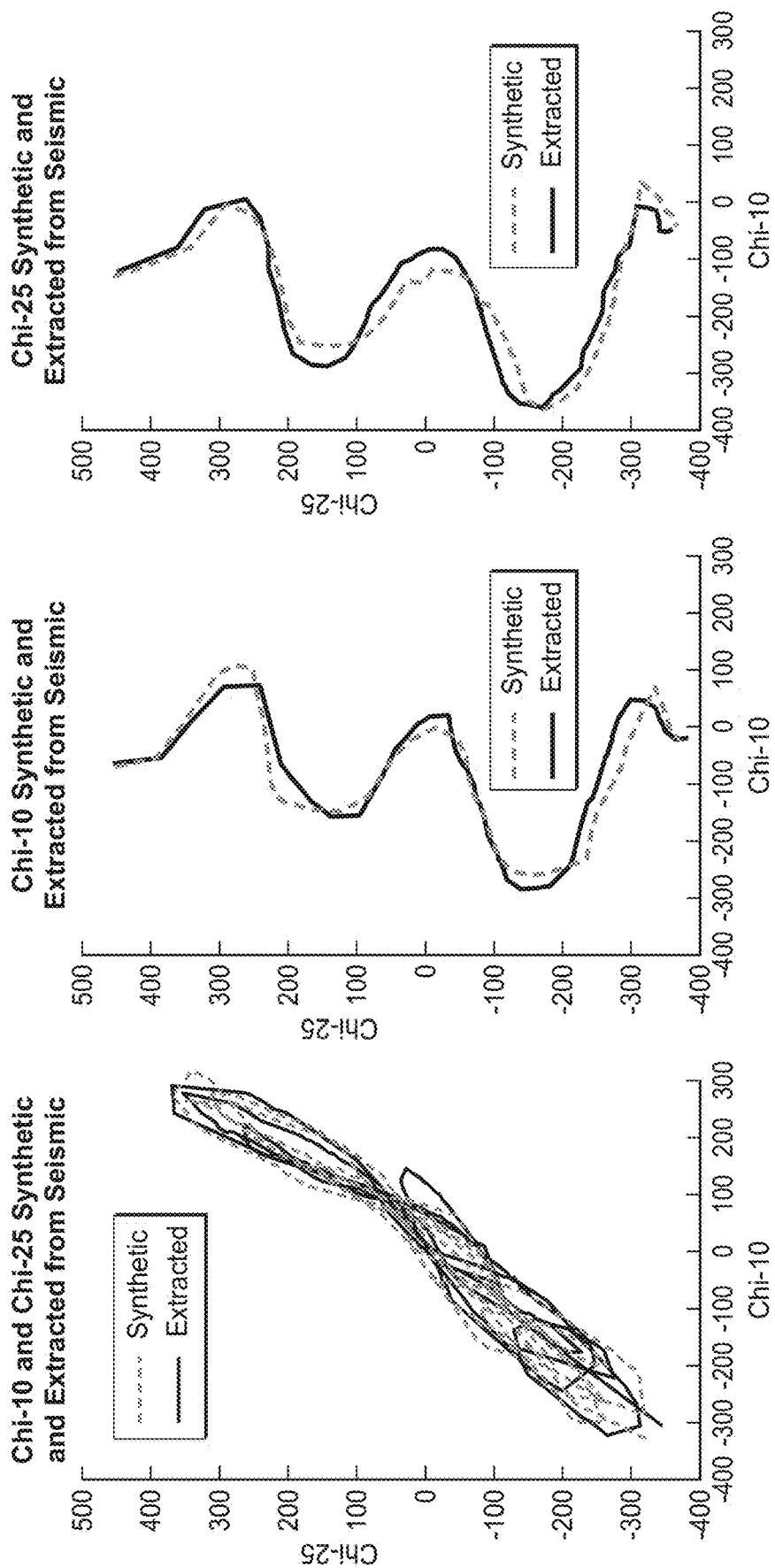
FIG. 4 illustrates examples of well tie displays.

Step 1 can include loading well logs, loading wavelets, and loading extracted traces. Examination of a well log display showing input Vp/Vs/Rho/Vshale/Phit (FIG. 2) can be used to determine optimal Vshale cut-offs (dashed line 201) for sand and shale (typically <0.5 and >0.5, respectively), and to ensure reasonability of log quality (removing spikes, removing data with gaps, ensuring reservoir properties of interest are in the interval. Examination of wavelet display can ensure reasonability of near and far wavelets; the example wavelets shown are quad phase, but they could be any phase (FIG. 3); and these wavelets are the bridge of elastic property pseudo-well logs to generating synthetic seismic data. Wavelets should have the correct frequency, amplitude, and phase information matching the seismic data in the reservoir interval. Step 1 can also include examination of a well tie display, which shows pseudo-well synthetic seismic traces (grey) and extracted-from-seismic-along-wellbore traces (black) (FIG. 4); these plots can validate that extracted wavelets have the correct frequency, amplitude, and phase information required to link the elastic well data to the seismic data, as well as the correct amplitude-vs-offset gradient.

Figure 5:
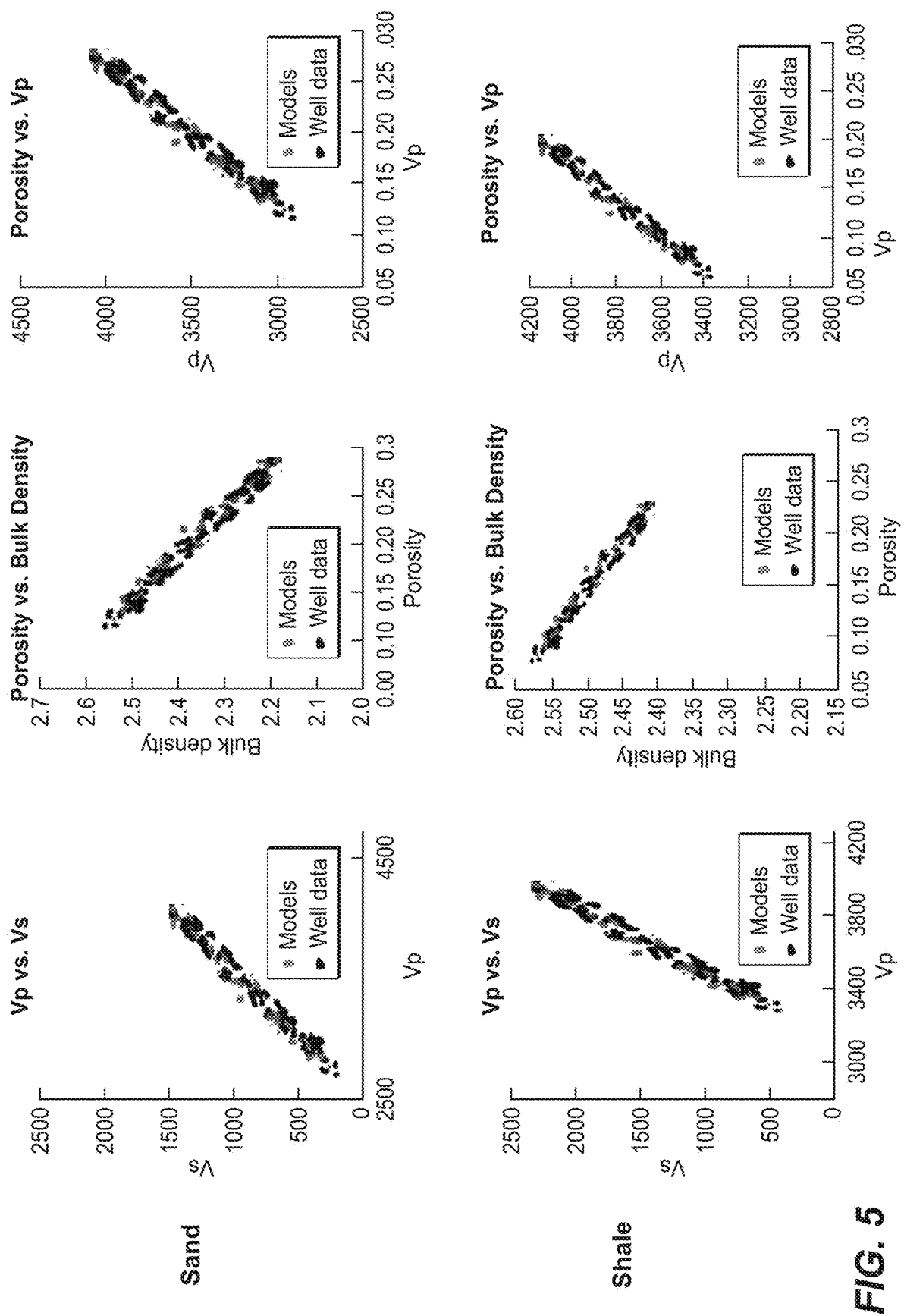
FIG. 5 illustrates elastic property cross-plots.

Step 2 can include tuning a linear rock physics model. After selection of vshale cut-offs for sand and shale, step 2 can include examination of elastic and rock property cross-plots (Vp, Vs, Rho, and Phit) to calibrate or tune a linear rock physics model using elastic property cross-plots (FIG. 5). At this point, fluid-substituted sand logs can be included (i.e. to model the different responses of water, oil, and gas sands). Calibrating the rock physics model is very simple, and can include centroid points for each property estimated by visual inspection, slope value for each plot, and standard deviation. Typically 2-3 iterations are required to match the rock physics model to the well data. More advanced rock physics models (i.e. Xu-White) can also be utilized. Parameters controlling the porosity range can also be determined during this step. For increased efficiency, this step can be automated through linear regression and statistical analysis of variance. Additional quality control steps can include examining conformance to other rock physics models (i.e. Gardner's Vp-Density relationship) and reasonability of values (i.e. Vp greater than Vp of water, Vp/Vs greater than 1.5, etc.). Elastic property values for pseudo-well models are constructed utilizing the rock physics model in the following manner:

Porosity→Vp, Density→Apply Vp, Density scatter (noise)
Vp→Vs→Apply Vs scatter (noise)

Figure 6:
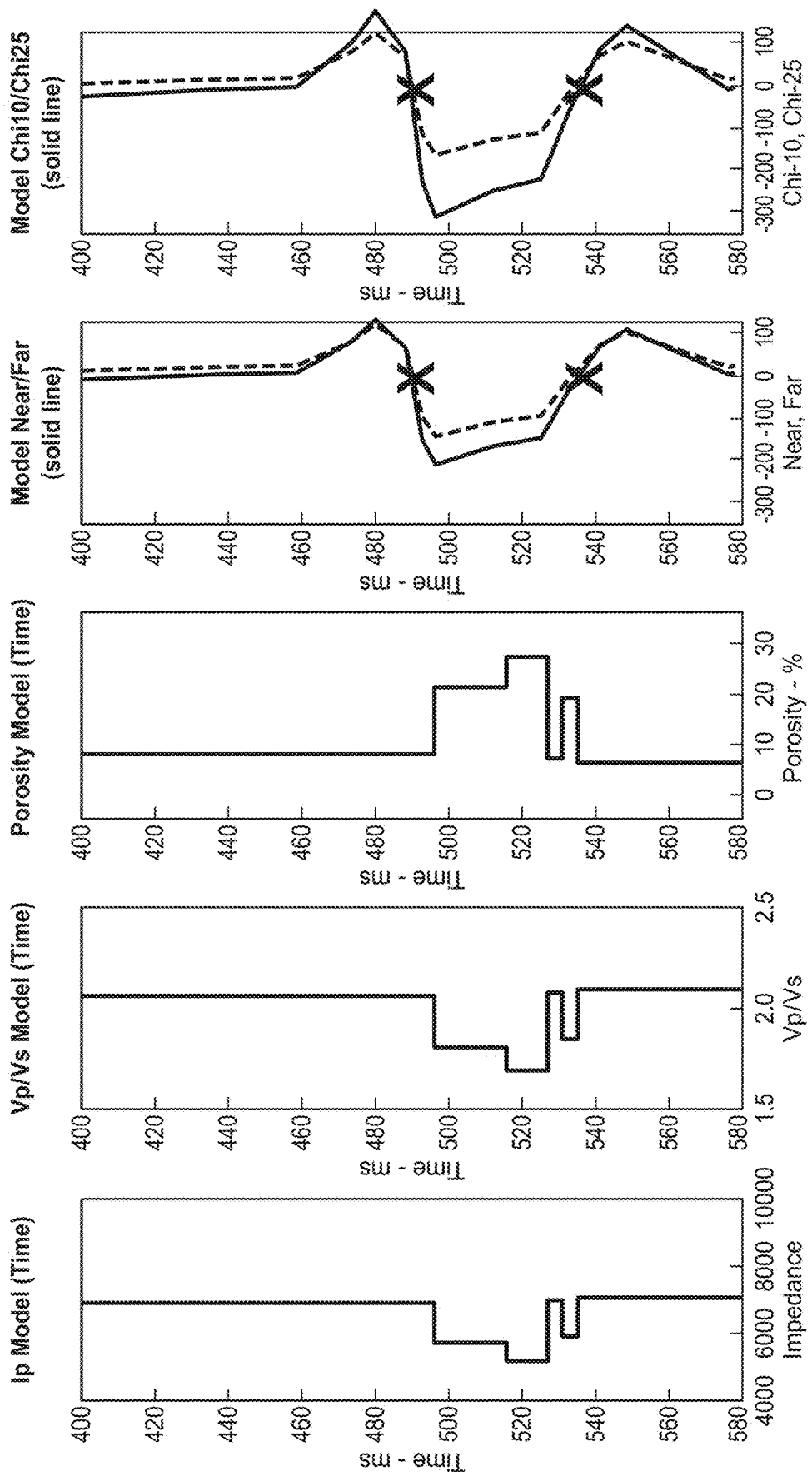
FIG. 6 illustrates elastic property models.

Step 3 can include tabbing through elastic property sand/shale models converted to time domain to ensure that stacking patterns are consistent with geologic expectations and seismic responses are within the scatter observed in the seismic data (FIG. 6). The three most important models to examine are the acoustic impedance (vp*density) model (controls zero-offset amplitude response), Vp/Vs model (controls amplitude-vs-offset gradient), and the porosity model. However, other models can also be useful (shear modulus, bulk modulus, Lame parameters, etc.).

Figure 7:
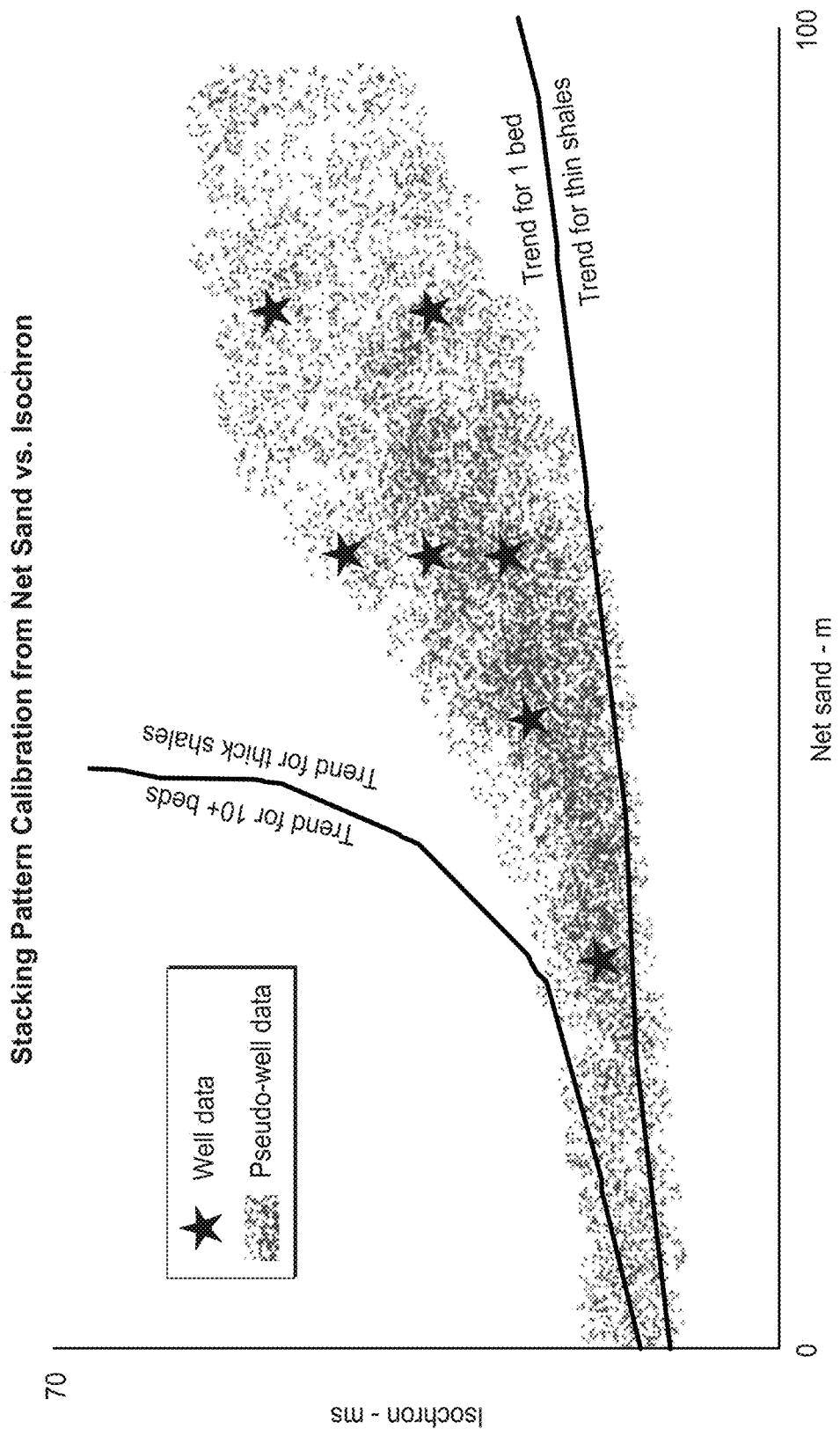
FIG. 7 illustrates a cross-plot of net sand thickness to isochron thickness.

Step 4 can include examination of the stacking pattern calibration plot, which is a cross-plot of Net Sand Thickness to Isochron Thickness (FIG. 7). Two parameters primarily control the shape and orientation of this trend; interbedded shale thickness, and number of sands. The shape of pseudowell points in this plot is calibrated to well points by altering the parameters of interbedded shale thickness and number of sands. Decreasing the number of sands or increasing interbedded shale thickness lowers the slope. Plotting well data reveals the expected trend (in this case, the optimal stacking pattern parameters are 2-4 sands with 5-10 m of interbedded shale). This plot is combined with geologic concept constraints to determine parameterization of numbers of sands, interbedded shale thickness, and sand thickness. Further enhancements include fining/coarsening upward of sands, transition matrices (i.e. low-porosity sand always sits atop high-porosity sand), fluid changes (i.e. oil on top of wet sand), and inclusion of cemented zones.

Step 5 can include generating a plurality of models for a subsurface region using a Monte Carlo approach and generating synthetic seismic traces from each of the plurality of models. Step 5 can include analyzing a synthetic seismic generator to ensure that models produced match expectations by examining synthetic seismic models converted to time domain; from left to right: synthetic near/far traces, and synthetic derivative traces (in this case, chi-10 and chi-25) (FIG. 6). Oftentimes at this step, rock physics or stacking pattern parameters will be refined (i.e. decreasing the scatter of sand Vp to preclude inclusion of models with a peak in the near stack).

Figure 8:
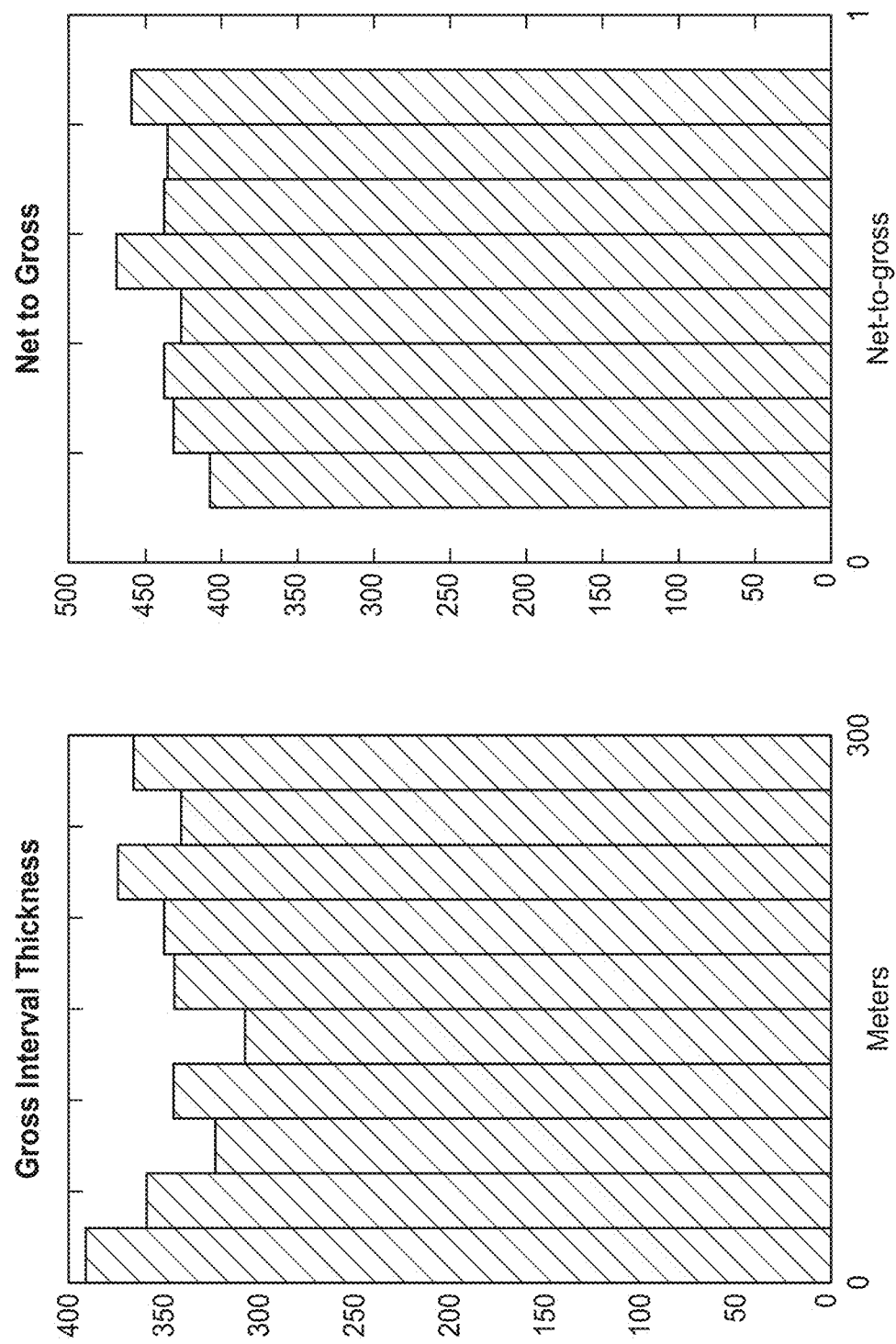
FIG. 8 illustrates gross in interval thickness and net to gross.

Step 6 can include providing quality control of the of gross interval thickness and net-to-gross distributions, ensuring that the distributions conform to geologic concept constraints (FIG. 8). Gross interval thickness min and max are typically estimated directly from isopach (interval thickness) maps generated using seismic data (step 12). Net-to-gross max can generally be left at 1 (single block of sand) unless geologic constraints deem otherwise, while minimum net-to-gross generally is a function of maximum gross thickness (i.e. extremely large gross intervals with low net-to-gross can produce multi-cycle synthetic models, which may not be observed in seismic data).

Step 6b can include QC (quality control) of the isochron picking algorithm (FIG. 6). Isochron picks are shown as black X's on the seismic traces. In this example, top and base of sand were picked off chi-25 zero crossings. These zero crossings can be found by determining the index of the peak amplitude, and searching upwards and downwards to find the nearest indices such that the sign of the current index is opposite of the following index. For picking top and base off zero phase data, the algorithm simply finds the min and max amplitude indices in the local area around the top and base of the bedset.

Step 6b can also include extracting seismic attributes in the interval specified by the top and base isochron on the synthetic seismic traces (property vs. attribute plots). However, this extraction of seismic attributes is not necessarily performed at the same time as the above-noted QC.

Step 7 can include analyzing cross-plots of Pore Thickness vs. Attributes across all stack and attribute pairs (typically 40-200 pairs). More rigorous exploration also probes combinations (i.e. Pore Thickness vs. attribute1*attribute2).

Figure 9:
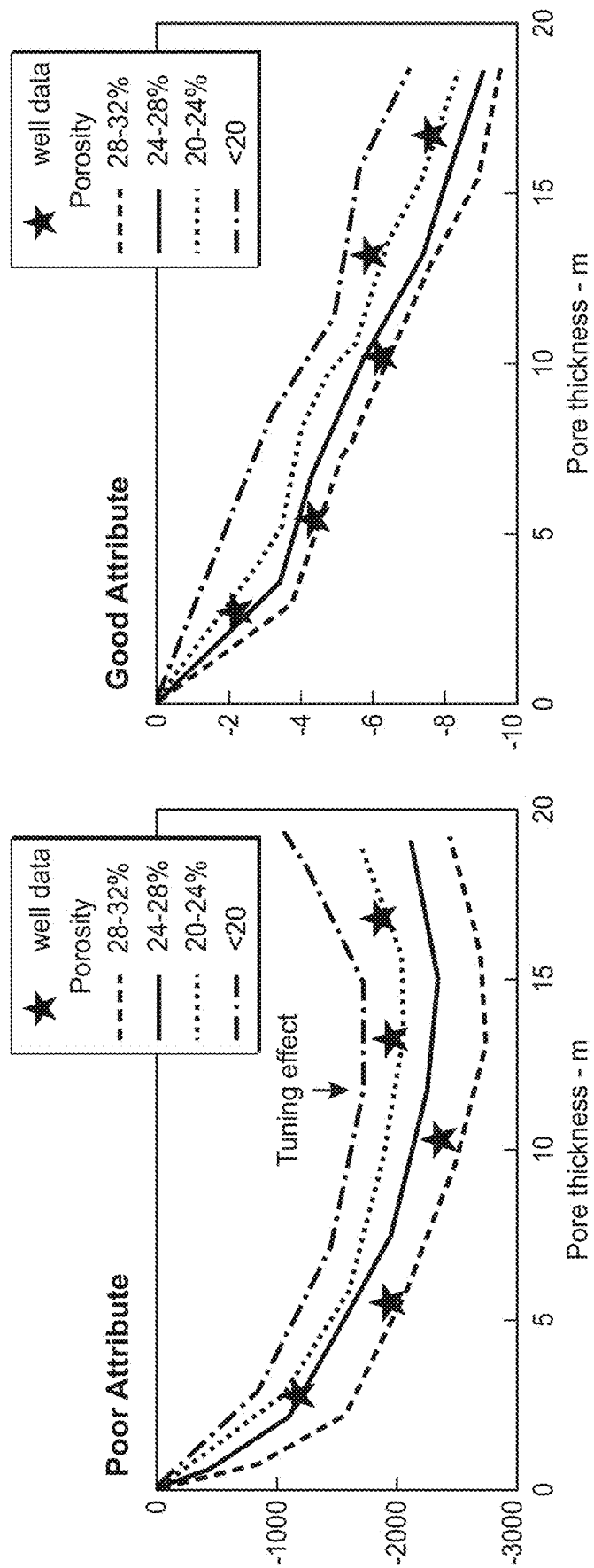
FIG. 9 illustrates cross-plots of an attributes vs. pore thickness.

An example of two cross-plots of Pore Thickness vs. Attributes is shown in FIG. 9. On the left is an example of a poor Attribute, which shows a low correlation to the reservoir property of interest, with a strong tuning effect and porosity separation. Meanwhile, the plot on the right shows a strong correlation. As the main goal of this search is to find attribute(s) with minimal porosity effects, model points in these plots are indicated by porosity. These analyses can be conducted qualitatively and/or automatically through linear regression. These cross-plots of Pore Thickness vs. Attributes are examined for all stack (near, mid, far, ultrafar, chi-10, chi-45, A–B, Ip+2Is, etc.) and attribute (min/max amp., min/max amp. times isochron thickness, integrated amp, integrated amp times isochron thickness, summed amp, signed magnitude amp, etc.) combinations to determine the most predictive seismic interval attributes. Furthermore, linear combinations of spectral attributes can also be explored at this step (i.e. 10 Hz Ricker decomposition of far min amp multiplied by 35 Hz Ricker decomposition of near integrated amp). For 4D seismic calibration, the change in reservoir property (usually water/oil/gas saturation) can be a change in amplitude of the attribute to determine most predictive 4D attributes. This is an example of a calibrated seismic interval attribute to pore thickness prediction function, which can be leveraged to convert interval attribute maps into pore thickness prediction maps:

Pore Thickness Most Likely=−0.00000005*(far stack integrated negative amplitude)*(isochron thickness)

Figure 10:
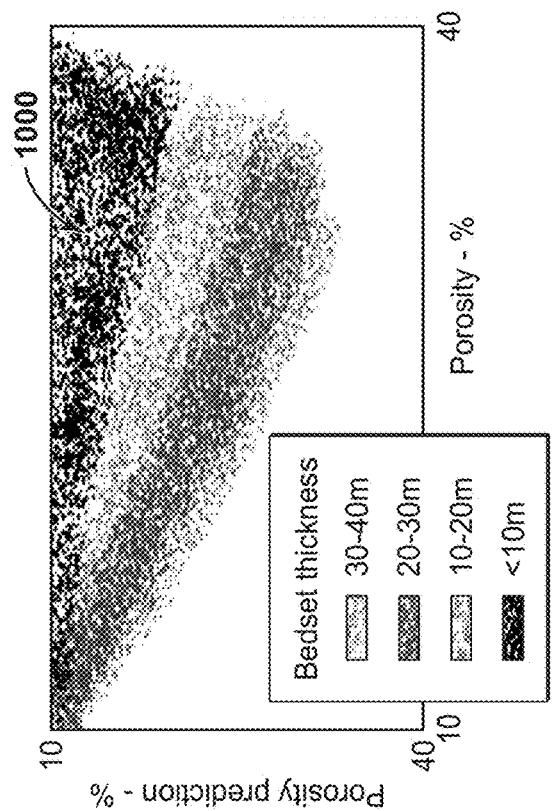
FIG. 10 illustrates optimal attribute(s) to porosity.

Step 8 can include the same procedure outlined in Step 7 to predict Pore Thickness, correlate optimal Attribute(s) to Porosity (FIG. 10). The main goal of this search is to find attribute(s) with minimal bedset thickness effects, so model points in these plots are denoted by bedset thickness. This correlation is used to generate an initial porosity prediction map(s). The arrow 1000 points to sands below tuning, which under-predict porosity due to deconstructive interference. This is an example of a calibrated seismic interval attribute to porosity prediction function, which can be leveraged to convert interval attribute maps into average sand porosity prediction maps:

Initial Porosity Most Likely=−0.0003*(near stack minimum amplitude)

Figure 11:
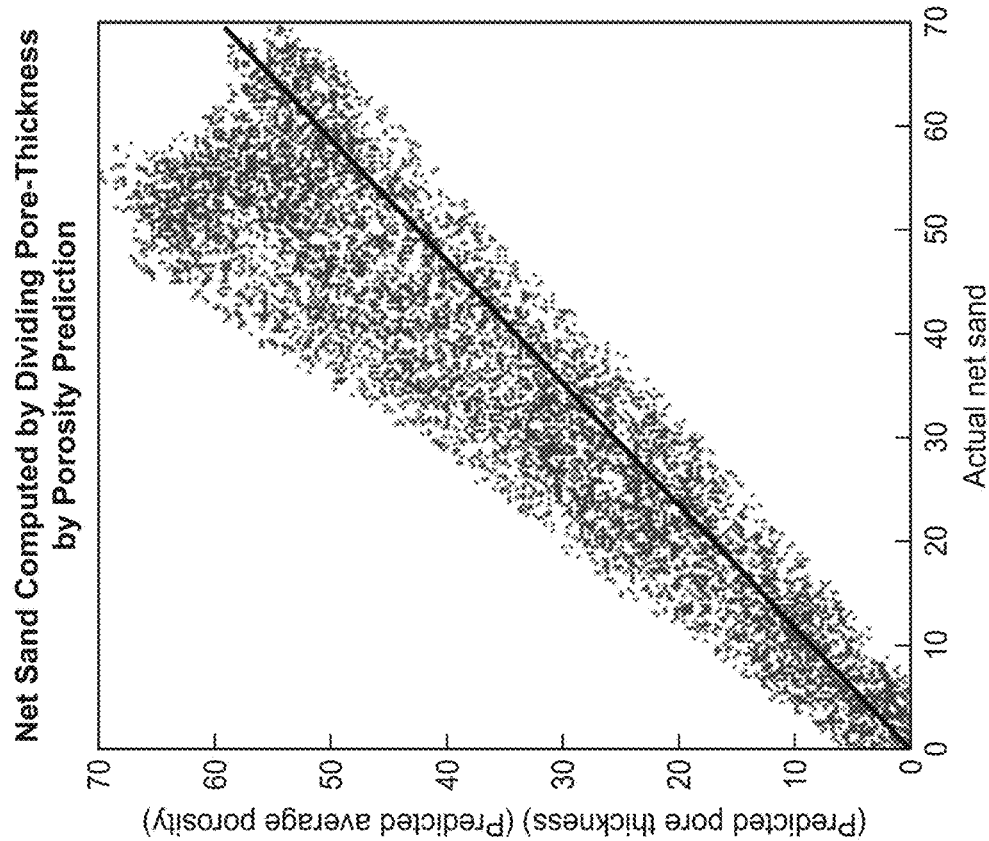
FIG. 11 illustrates computation of net sand thickness.

Step 9 can include utilizing the final optimized prediction attributes of Pore Thickness and Porosity to compute Net Sand Thickness by taking the quotient of predicted Pore Thickness and predicted Porosity (FIG. 11). Except in cases where porosity predictions are very poor, this technique outperforms direct Net Sand Thickness prediction, as it minimizes prediction bias caused by porosity. After confirming that the net sand thickness predictions are reasonable, net sand thickness map(s) can be generated using this formula:

Net Sand Thickness Most Likely=(Pore Thickness Most Likely)/(Initial Porosity Most Likely)

Figure 12:
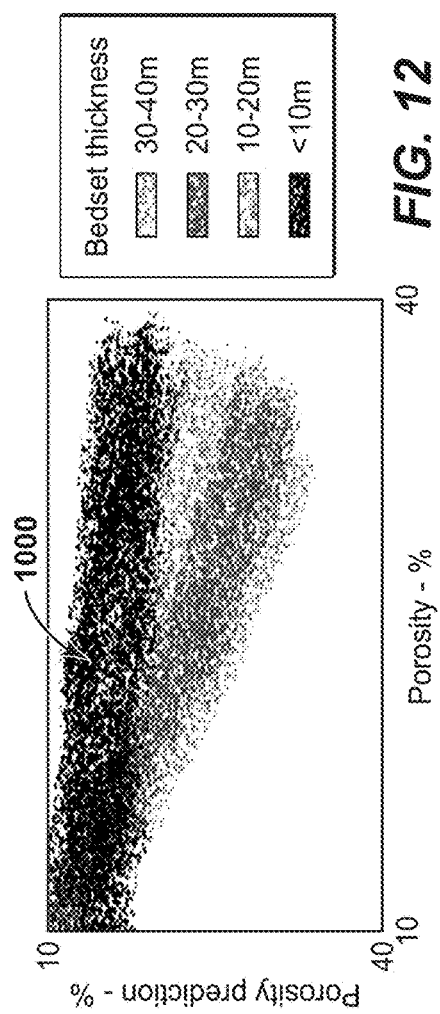
FIG. 12 illustrates corrected porosity prediction.

In step 10, net sand thickness predictions can be leveraged to correct the initial Porosity prediction for amplitude bias (tuning) caused by variations in Net Sand Thickness, increasing accuracy of thin-bed predictions by pushing those predictions towards the mean (FIG. 12). The value of this correction at each thickness can be found through generation of a tuning curve, and the correction is only applied for predicted sand thicknesses below tuning. First, the correct function is computed (i.e. (30−Net Sand Thickness Most Likely)*(1/800)) by examining cross-plots of Model Thickness vs. Predicted Porosity Residual or just fitting a function to a tuning curve, which a person skilled in the art will be familiar with.

Final Porosity Most Likely=Initial Porosity Most Likely+(30−Net Sand Thickness Most Likely)* (1/800);

Step 11 can include re-computing Net Sand Thickness by the quotient of the Pore Thickness prediction and updated ("de-tuned") Porosity:

Net Sand Thickness Most Likely=(Pore Thickness Most Likely)/(Final Porosity Most Likely)

Figure 13:
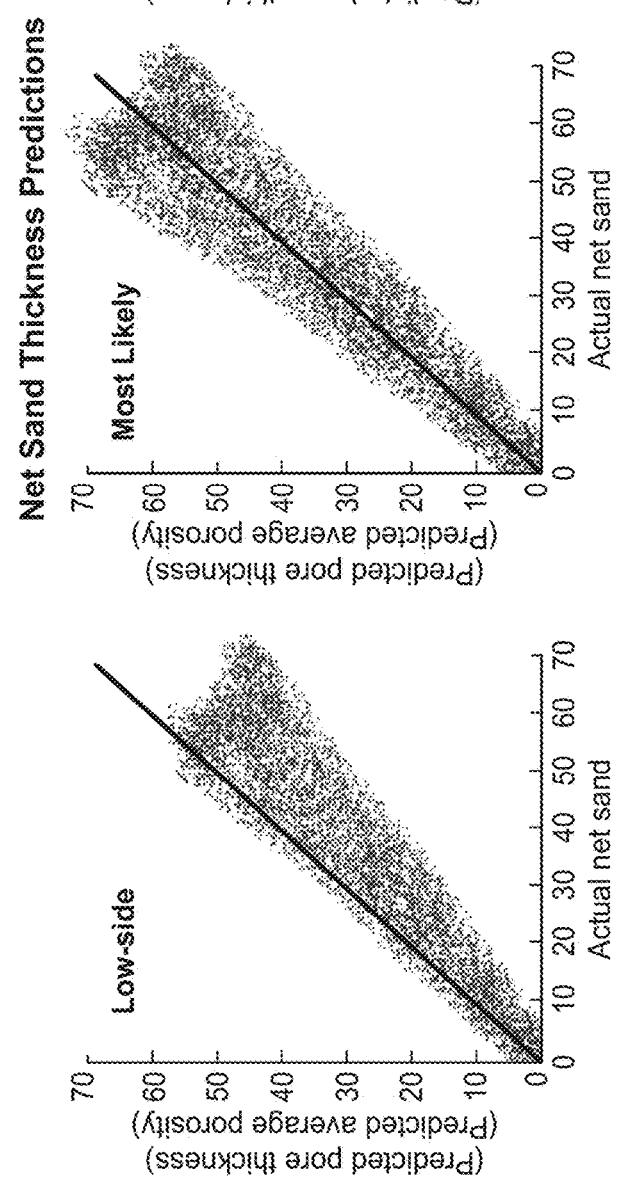
FIG. 13 illustrates low-side, most likely, and high-side net sand predictions.

Step 12 can include determining low-side, most likely, and high-side correlation functions of Net Sand Thickness and Porosity (FIG. 13). This can be performed by repeating steps 7-11, but matching the lower and upper regions of the attribute(s) vs. rock property plots instead of the center. Step 12 can utilize map isochrones and interval attribute maps generated by known commercial software packages.

As an alternative, in step 13, for predicting oil volumes, one can perform step 7, but use net hydrocarbon pore thickness (NHCPT) instead of pore thickness. There is then no need to perform steps 8 through 11 when predicting NHCPT directly, which greater speeds up the process. One can then perform step 12 to obtain low-side, most likely, and high-side NHCPT maps. The product of the mean NHCPT for each map and the area of the given map gives oil volume estimation:

Oil Volume In Polygon=(Mean of NHCPT Most Likely Map)*(Area of Polygon)

Additionally, the present technological advancement can compute gross interval thickness map(s), given by depth of top interpretation surface(s) minus depth of base interpretation surface(s). Net-to-gross prediction maps can be computed by taking the quotient of estimated gross interval thickness map(s) and predicted Net Sand Thickness map(s):

Net to Gross Most Likely=(Net Sand Thickness Most Likely)/(Gross Interval Thickness)

Additionally, the present technological advancement can combine the results of the gross interval thickness map(s) and a transform of porosity map(s) to permeability maps in order to rapidly produce quantitative low-side, most-likely, and high-side estimates of total expected oil recoverable (EUR).

Additionally, the present technological advancement can apply variogram to net-to-gross prediction map(s) to populate seismic-consistent 3D sand and shale model.

Additionally, the present technological advancement can apply variogram to Porosity map(s) to populate seismic-consistent 3D sand model with seismic-derived porosity values.

The prediction maps and oil volume estimates can be used in hydrocarbon management to assess and evaluate hydrocarbon assets. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 14:
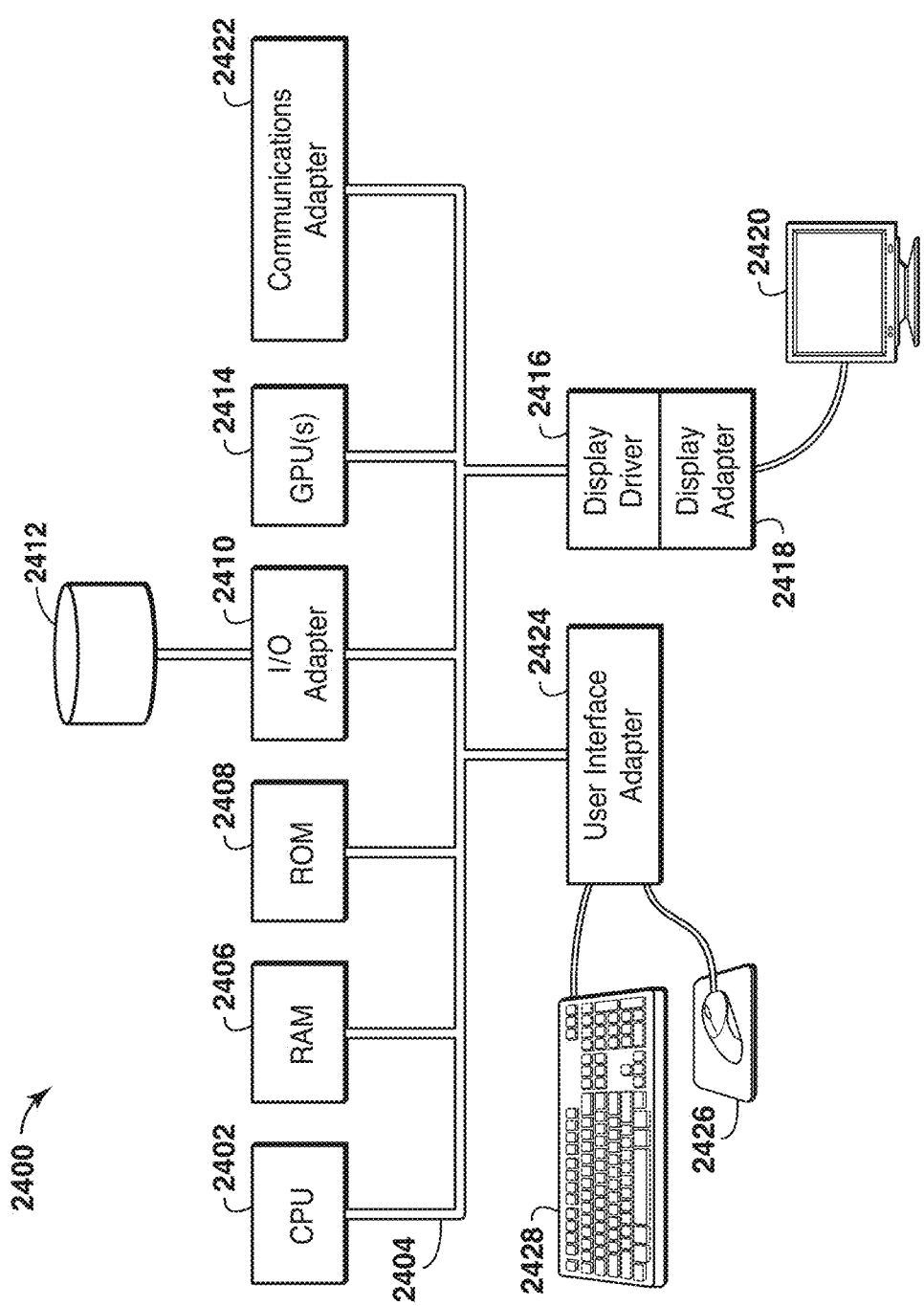
FIG. 14 illustrates a computer system that can execute the present technological advancement.

FIG. 14 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 14, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following documents are hereby incorporated by reference in their entirety:

Ayeni, G., A. Huck, and P. de Groot, 2008, Extending reservoir property prediction with pseudo-wells: First Break, 26, 57-62, doi: 10.3997/1365-2397.2008017;

De Groot, P., A. H. Bril, F. J. Floris, and A. E. Campbell, 1996, Monte Carlo simulation of wells: Geophysics, 61, 631-638, doi: 10.1190/1.1443992;

Spikes, K., and J. Dvorkin, 2004, Pseudo-well and synthetic seismic data generation: 74th Annual International Meeting, SEG, Expanded Abstracts, 1714-1717;

Whitcombe, D. N., P. A. Connolly, R. L. Reagan, and T. C. Redshaw, 2002, Extended elastic impedance for fluid and lithology prediction: Geophysics, 67, 63-67, doi: 10.1190/1.1451337;

Connolly, Patrick A, et al., Stochastic Inversion by Matching to Large Numbers of pseudo-wells; Geophysics, vol. 81, issue 2, pp. M7-M22, (2016);

U.S. patent documents 2010001713, U.S. Pat. Nos. 7,254,091, 7,706,981, 8,688,425;

"Seismic attributes for reservoir studies," PetroWiki, petrowiki.org/Seismnic_attributes_for_reservoir_studies 14 pages, obtained on Sep. 8, 2016; and Avseth, Per et al., Combining burial history and rock physics modeling to constrain AVO analysis, The Leading Edge, pp. 528-534, June 2016.

What is claimed is:

1. A method, comprising:
   calibrating a linear rock physics model to well log properties;
   generating a plurality of pseudo-well models for a subsurface region using a Monte Carlo approach;
   generating synthetic seismic traces from each of the plurality of pseudo-well models;
   computing top and base isochron from the synthetic seismic traces;
   computing seismic attributes in an interval specified by the top and base isochron on the synthetic seismic traces;
   correlating the seismic attributes to rock properties, wherein the correlating includes predicting pore thickness and porosity from a correlation between at least one of the seismic attributes and rock properties;
   predicting net sand thickness from the pore thickness and porosity predictions; and
   transforming seismic data into low-side, most-likely, and high-side estimates of rock properties.

2. The method of claim 1, further comprising:
   refining the porosity prediction based on the net sand thickness prediction through generation of a tuning curve; and
   recomputing the net sand thickness by taking a quotient of the predicted pore pressure and a corrected porosity prediction.

3. The method of claim 2, further comprising:
   generating the tuning curve by examining cross-plots of model thickness vs. predicted porosity residual.

4. The method of claim 1, wherein the computing seismic attributes includes analyzing cross-plots of pore thickness vs. each of the seismic attributes, determining a most predictive seismic attribute, and generating a calibrated seismic attribute to pore thickness prediction function.

5. The method of claim 1, further comprising:
   extracting hydrocarbons from a location in a reservoir determined from the net sand thickness.

6. The method of claim 1, further comprising calibrating interbedded shale thickness and number of sands with a cross-plot of net sand thickness to isochron thickness.

7. The method of claim 1, further comprising distributing predicted rock properties into a seismic-consistent 3D geologic model with a variogram.

8. A method, comprising:
   calibrating a linear rock physics model to well log properties;
   generating a plurality of pseudo-well models for a subsurface region using a Monte Carlo approach;
   generating synthetic seismic traces from each of the plurality of pseudo-well models;
   computing seismic attributes on the synthetic seismic traces;
   correlating the seismic attributes to net hydrocarbon pore thickness;
   transforming seismic data into low-side, most-likely, and high-side net hydrocarbon pore thickness maps; and
   estimating an oil volume from a product of a mean of the net hydrocarbon pore thickness from a given one of the maps and an area of a region on the given one of the maps.

9. The method of claim 8, further comprising causing oil to be extracted from a reservoir corresponding to the region on the given one of the maps.

* * * * *